(12) United States Patent
Swartzer et al.

(10) Patent No.: US 7,076,946 B2
(45) Date of Patent: Jul. 18, 2006

(54) HYDRAULIC KICKER CONTROL PISTON

(75) Inventors: David G. Swartzer, Watertown, MN (US); Michael J. Voigt, Eden Prairie, MN (US); Rodney V. Singh, Savage, MN (US)

(73) Assignee: Eaton Corporation, Cleveland, OH (US)

( * ) Notice: Subject to any disclaimer, the term of this patent is extended or adjusted under 35 U.S.C. 154(b) by 145 days.

(21) Appl. No.: 10/919,160

(22) Filed: Aug. 16, 2004

(65) Prior Publication Data

US 2006/0032220 A1   Feb. 16, 2006

(51) Int. Cl.
*B60K 6/12* (2006.01)
(52) U.S. Cl. ......................................... 60/414; 180/165
(58) Field of Classification Search .................. 60/414, 60/416; 180/165
See application file for complete search history.

(56) References Cited

U.S. PATENT DOCUMENTS

| | | | |
|---|---|---|---|
| 3,892,283 A * | 7/1975 | Johnson ..................... | 180/165 |
| 4,098,144 A * | 7/1978 | Besel et al. ................ | 180/165 |
| 4,441,573 A * | 4/1984 | Carman et al. ............. | 60/416 |
| 4,986,383 A * | 1/1991 | Evans ........................ | 60/414 |
| 6,971,232 B1* | 12/2005 | Singh ......................... | 60/414 |
| 2006/0000207 A1* | 1/2006 | Rush .......................... | 60/413 |

FOREIGN PATENT DOCUMENTS

WO   WO 2004026607 A1 *   4/2004

* cited by examiner

*Primary Examiner*—Thomas E. Lazo
(74) *Attorney, Agent, or Firm*—L. J. Kasper (57) ABSTRACT

A pump-motor unit (35) including a swashplate (95) having a neutral position (FIG. 3) and first and second displaced positions and comprising first (87) and second (89) pressure actuators associated with the swashplate. Displacement of the swashplate is proportional to substantially only the difference in fluid pressure between a high pressure source (41) and a low pressure source (39). The first pressure actuator includes a first control piston (121) having a first effective area (A1), and the second pressure actuator includes a second control piston (127) having a second effective area (A2), the second effective area being at least somewhat greater than the first effective area. If the high and low pressure sources are at substantially the same pressure, the pressure acting on both of the first and second effective areas will displace the swashplate from neutral toward the second displaced position.

3 Claims, 5 Drawing Sheets

HYDRAULIC KICKER CONTROL PISTON

BACKGROUND OF THE DISCLOSURE

The present invention relates to hydraulic drive systems of the type including a variable displacement hydrostatic pump or motor unit, and more particularly, to such a drive system of the type including a pump-motor unit which operates as a pump during a portion of the vehicle operating cycle, and as a motor during another portion of the vehicle operating cycle. Even more particularly, the present invention relates to such a hydraulic drive system in which the pump-motor unit is of the type having a variable swashplate, the direction of displacement and tilt angle of which are varied only by changes in a control pressure communicated to a pair of fluid pressure actuators.

Although the hydraulic drive system of the present invention may be utilized in hydraulic drive systems of various types, including such drive systems which effectively serve as the primary vehicle transmission during at least most of the vehicle operating cycle, the present invention is especially advantageous when used on a hydraulic drive system which comprises part of a vehicle hydraulic regenerative braking system, and will be described in connection therewith. However, it should be understood that the present invention is not limited to use only in connection with a vehicle drive system, but could be used with various types of stationary and/or industrial equipment. Therefore, as used hereinafter and in the appended claims, references to receiving torque from a "drive line" or transmitting drive torque to such a "drive line", will be understood to mean and include any sort of torque transmitting drive line, whether or not such drive line is part of a vehicle drive system, or part of some other, non-vehicle type of drive system.

In a vehicle hydraulic drive system of the type having regenerative braking capability, the drive system includes, in addition to the pump-motor unit referenced previously, a high pressure accumulator and a low pressure accumulator, and the appropriate control valving to control the flow of fluid, especially between the high pressure accumulator and the pump-motor unit. In the hydraulic drive system of the present invention, the swashplate of the pump-motor unit is tilted in a first displacement orientation when the pump-motor unit is operating in the pumping mode (when the pump-motor unit is receiving torque from the drive line) and then the swashplate moves "over-center" and is displaced in a second displacement orientation when the pump-motor unit is operating in the motoring mode (when the pump-motor unit is transmitting torque to the drive line).

Furthermore, as is now well known to those skilled in the art of such drive systems, the "control pressure" used to drive the swashplate of the pump-motor unit toward either its first displacement orientation or its second displacement orientation is typically provided by the high pressure accumulator. Disposed between the high pressure accumulator and the pump-motor unit is a main control valve means which would communicate control pressure to one of the fluid pressure actuators of the swashplate, while communicating the other fluid pressure actuator of the swashplate to the low pressure side of the system. Such an arrangement differs from the typical variable displacement axial piston pump which receives its control pressure from a charge pump driven off of the same input shaft which drives the main axial piston pump rotating group (cylinder barrel and pistons).

Another difference between the pump-motor unit of the type with which the present invention is utilized and the conventional, variable displacement axial piston pump relates to the centering of the fluid pressure actuators and the swashplate. In the conventional axial piston pump, each of the fluid pressure actuators is typically spring-centered, but in the pump-motor unit of the invention, the actuators would most likely not include centering or return springs. There are several reasons for omitting the conventional centering springs from the pump-motor unit of the invention. The conventional centering springs are large (thus complicating the packaging) and are expensive, and require a substantial amount of hydraulic energy to overcome, in order to move the swashplate from the neutral position to a displaced position. Finally, the presence of large, high force centering springs in the pump-motor unit of the invention would substantially increase the response time for the unit to transition between its various modes.

Therefore, the displacement of the swashplate is a function of (i.e., proportional to) substantially only the pressure differential between the high side of the system (in the subject embodiment, the high pressure accumulator) and the low pressure side of the system (such as a low pressure accumulator). It will be understood by those skilled in the art that, although reference has been made herein to the low pressure side of the system comprising a low pressure accumulator, such is not an essential feature of the invention. All that is essential is that there be a "low pressure source", which could be a low pressure accumulator, but could also merely be the case drain region of the pump-motor unit, or a reservoir (whether or not pressurized). All that is essential is that there be a source of pressure at least slightly greater than atmospheric pressure, for reasons which will become apparent subsequently.

Although the hydraulic drive system of the type described above has proven to be very satisfactory in operation, it has been observed during the development of a commercial embodiment of the system that, in the absence of the present invention, there is at least one operating condition under which the pump-motor unit may not operate in the manner desired. In the event of leakage from the high pressure side of the system (or if there is an extended "idle" period), thus permitting the high pressure accumulator to leak down and be at the same pressure as the low pressure accumulator, then both of the fluid pressure actuators of the pump-motor unit would be subjected to the same, low pressure. Under the condition just described, the pump swashplate would move to a centered (neutral, zero displacement) position. When the system logic would subsequently command displacement of the swashplate, so that the pump-motor unit would operate in either the pumping mode or the motoring mode, there would be no pressure differential to move the swashplate from the neutral position toward the appropriate, displaced position. Thus, the pump-motor unit, in the absence of the invention, would thereafter be unable either to convert input torque from the drive line into stored pressure in the high pressure accumulator, if that is what was commanded, or to transmit stored pressure into torque to be transmitted to the drive line, if that is what was commanded.

BRIEF SUMMARY OF THE INVENTION

Accordingly, it is an object of the present invention to provide an improved hydraulic drive system having a pump-motor unit of the type described, which overcomes the problem of the swashplate of the pump-motor unit being unable to achieve displacement when the high pressure side of the system leaks down.

It is a more specific object of the present invention to provide such an improved hydraulic drive system, and a pump-motor unit for use therein, in which, even with the high pressure and low pressure sides of the system at the same pressure, the fluid pressure actuators of the swashplate are able to move the swashplate to a displaced position.

The above and other objects of the invention are accomplished by the provision of a hydraulic drive system including a hydrostatic pump-motor unit operable, in a pumping mode, receive torque from a drive line, and operable, in a motoring mode, to transmit drive torque to the drive line. A high pressure accumulator is in fluid communication with a first port of the pump-motor unit, and a low pressure source is in fluid communication with a second port of the pump-motor unit. The pump-motor unit includes a swashplate having a neutral position and first and second displaced positions oppositely disposed about the neutral position. The pump-motor unit further comprises first and second fluid pressure actuators operably associated with the swashplate to displace the swashplate toward the first and second displaced positions, respectively. A main control means is in fluid communication with the first and second fluid pressure actuators, and with the high pressure accumulator and with said low pressure source, whereby the displacement of the swashplate is proportional to substantially only the difference in fluid pressure between the high pressure accumulator and the low pressure source. The first fluid pressure actuator includes a housing portion defining a piston bore and a first control piston disposed within the first piston bore, the first control piston having a first effective area in fluid communication with the main control means.

The improved hydraulic drive system is characterized by the second fluid pressure actuator including a housing portion defining a second piston bore and a second control piston disposed within the second piston bore, the second control piston having a second effective area in fluid communication with the main control means. The second effective area is at least somewhat greater than the first effective area whereby, in the event of the high pressure accumulator and the low pressure source being at substantially the same pressure, the control pressure acting on both of the first and second effective areas will displace the swashplate from the neutral position toward the second displaced position.

DETAILED DESCRIPTION OF THE PREFERRED EMBODIMENT

Figure 1:
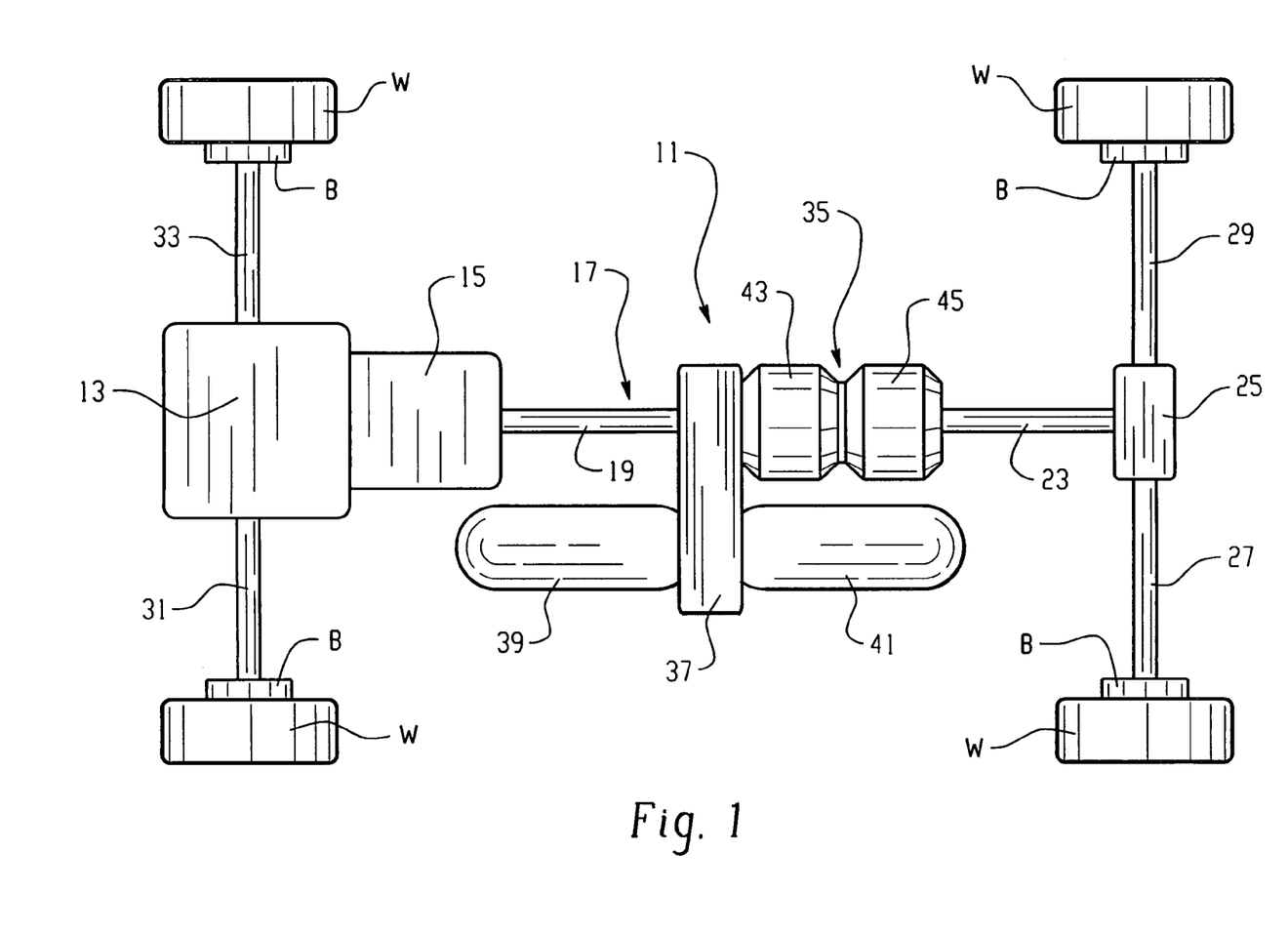
FIG. 1 is a schematic view of an entire vehicle drive system of the type with which the hydraulic drive system of the present invention is especially well suited.

Referring now to the drawings, which are not intended to limit the invention, FIG. 1 illustrates a vehicle drive system of the type for which the hydraulic drive system of the present invention is especially well suited. The vehicle system shown schematically in FIG. 1 has four drive wheels W, although it should be understood that the present invention is not limited to a vehicle having four-wheel drive (or even one having vehicle drive wheels at all, as mentioned in the Background of the Disclosure). The invention could also be used with a vehicle having only two-wheel drive, and in that case, the two drive wheels could be either rear drive wheels or front drive wheels. Operably associated with each of the drive wheels W is a conventional type of wheel brake B, the details of which form no part of the present invention, and the wheel brakes B will be referred to only briefly hereinafter. Preferably, the wheel brakes B, if such were present, would be part of an overall EHB (electro-hydraulic brake) system, of the type which is just now becoming well known to those skilled in the art, and commercially available.

The vehicle includes a vehicle drive system, generally designated 11, which includes a vehicle engine 13 and a transmission 15. It should be understood that the particular type of engine 13 and transmission 15 and the construction details thereof, as well as the drive system arrangement, etc., form no part of the present invention, except to the extent specifically recited in the appended claims, and therefore, will not be described further herein. Furthermore, the present invention is not even limited specifically to use with what is normally thought of as an "engine", and therefore, it will be understood that, within the scope of the invention, references to an "engine" will mean and include any type of power source or other prime mover.

Extending rearwardly from the transmission 15 is a drive line, generally designated 17. In the subject embodiment, and by way of example only, the drive line 17 includes a forward drive shaft 19, an intermediate drive shaft (not visible in FIG. 1), a rearward drive shaft 23, an inter-wheel differential 25 and left and right rear axle shafts 27 and 29. Those skilled in the art will understand, from a subsequent reading and understanding of the present specification, that the drive line 17 has been illustrated and described as comprising the shafts 19 and 23 primarily to facilitate understanding of the overall vehicle drive system 11, and not by way of limitation.

The drive system 11, in the subject embodiment, also includes left and right forward axle shafts 31 and 33, respectively. Referring still primarily to FIG. 1, in addition to the "mechanical" elements already described and which are fairly conventional, the drive system 11 also includes a hydrostatic pump-motor unit, generally designated 35, and disposed forwardly of the pump-motor unit 35 is a valve manifold 37. Attached to a forward portion of the valve manifold 37 is a low pressure accumulator 39, and attached to a rear portion of the valve manifold 37 is a high pressure accumulator 41, although the particular arrangement could be reversed, or changed, or rearranged in some other manner. It should also be understood that the particular design and details of the valve manifold 37 (except to the extent noted hereinafter) and the accumulators 39 and 41 are not essential features of the present invention, and therefore, the construction details of each is not illustrated or described herein. Instead, the general function and operation of each will be described briefly, in connection with the system schematic of FIG. 2, but then only to the extent necessary to describe the several operating modes of the hydraulic drive system as "environment" for the explanation of the pump-motor unit 35, and the swashplate controls therefor, of the present invention.

Referring still primarily to FIG. 1, the pump-motor unit 35 will be described in slightly more detail, to facilitate an understanding of the overall hydraulic drive system shown in FIG. 1. The pump-motor unit 35 includes a clutch assembly portion, generally designated 43, and a pump-motor portion, generally designated 45. It may be seen that the intermediate drive shaft extends completely through the hydrostatic pump-motor unit 35 and would preferably have, at its forward end, a universal joint coupling (not shown herein), for connection to the forward drive shaft 19. Similarly, the intermediate drive shaft would preferably have, at its rearward end, a universal joint coupling (also not shown herein), for connection to the rearward drive shaft 23, although, within the scope of the invention, the particular arrangement shown and described could be reversed or changed in some other manner. Thus, the pump-motor unit 35 may either receive drive torque from the drive line or transmit drive torque to the drive line, depending upon whether the pump-motor unit 35 is in the pumping mode or the motoring mode, respectively.

Figure 2:
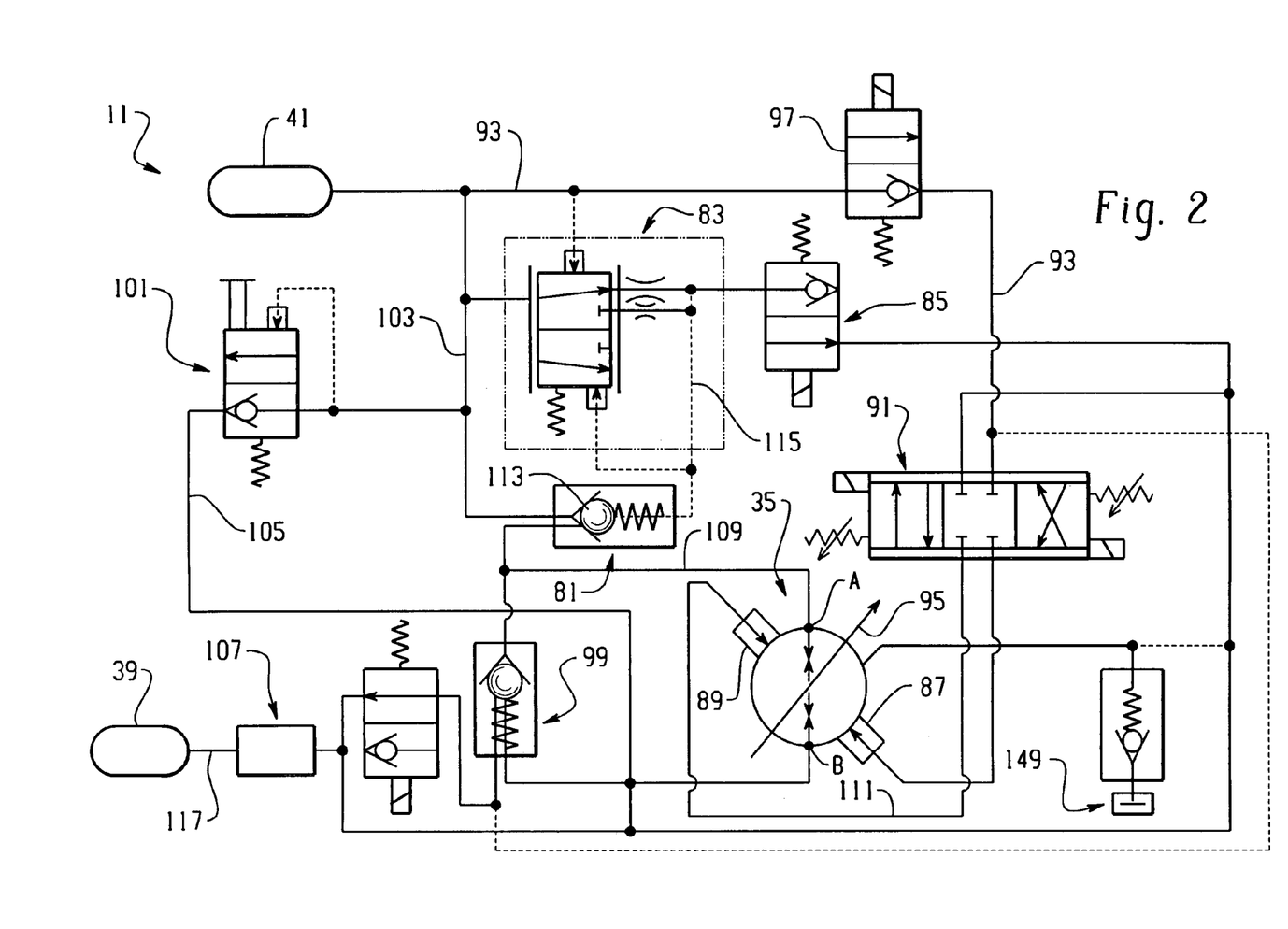
FIG. 2 is a hydraulic schematic of one embodiment of a hydraulic drive system of the type to which the present invention relates, including the pump-motor unit of the present invention.

Referring now primarily to FIG. 2, it should be understood that, other than the pump-motor unit 35 and the two accumulators 39 and 41, everything else shown in the hydraulic schematic of FIG. 2 would typically be included within the valve manifold 37, seen in FIG. 1 or attached to the valve manifold 37. It should also be understood that, whenever the pump-motor unit 35 is in its neutral (zero displacement) condition (which is the case whenever the vehicle is not in a deceleration-acceleration cycle), there is no substantial flow within the hydraulic system shown in FIG. 2, between the pump-motor unit 35 and the two accumulators 39 and 41. However, as is well known to those skilled in the art of such systems, because of the pre-charge on each of the accumulators 39 and 41, as will be discussed in greater detail subsequently, the system is intended to remain "pressurized", even while the pump-motor unit 35 is in its neutral (zero displacement) condition.

The hydraulic system (as shown in FIG. 2), which is included within the valve manifold 37, includes a mode control valve 81, and operably associated therewith, a step-orifice control valve 83 and a solenoid-type mode pilot valve 85. The function and operation of the valves 81, 83 and 85 will be described in slightly greater detail subsequently, although what will be said hereinafter about the valves 81, 83 and 85 will be primarily by way of illustration and enablement of the present invention, and not at all by way of limitation of the present invention. The construction and operation of the mode control valve 81, and the other valves 83 and 85, is illustrated and described in greater detail in co-pending application U.S. Ser. No. 10/832,967, filed Apr. 27, 2004 in the name of Rodney V. Singh, for a "Hydraulic Drive System and Improved Control Valve Assembly Therefor".

The pump-motor unit 35 is of the variable displacement type, and therefore, includes some sort of displacement-varying means, such as a pair of fluid pressure servo actuators of the type shown in FIG. 2 and designated 87 and 89. The servo actuators 87 and 89 are connected, hydraulically, to the outlets of a typical electro-hydraulic controller 91 (referred to hereinafter in the appended claims as a "main control means" for the actuators 87 and 89). The function of the controller 91 is to communicate pressurized fluid from a conduit 93 to one of the servo actuators 87 or 89, as appropriate, to achieve the desired "mode", i.e., the desired angle and displacement of a swashplate 95, all of which is generally well known to those skilled in the pump and motor art, and especially the axial piston pump art. Those skilled in the art of hydraulic drive systems of the type to which the invention relates will understand that, like typical HST systems, there can be mechanical feedback from the swashplate 95 of the pump-motor unit 35 to the controller 91 (not shown in FIG. 2). Preferably, however, feedback to the controller 91 is achieved electronically, including even the indication of the position of the swashplate 95. It should be understood that any type of feedback arrangement (or none at all) is within the scope of the present invention.

Disposed in series between the high pressure accumulator 41 and the electro-hydraulic controller 91 is an isolation valve 97 which, as shown in FIG. 2, is preferably a poppet-type valve which is solenoid operated. Whenever the hydraulic drive system 11 is operating, the isolation valve 97 is "ON", i.e., high pressure ("control pressure") is freely communicated from the high pressure accumulator 41 to the controller 91. Whenever the hydraulic drive system 11 is "OFF", the isolation valve 97 is spring biased to the position shown in FIG. 2 in which it keeps the pump-motor unit 35 and the controller 91 "isolated" hydraulically from the high pressure accumulator 41, so that the accumulator 41 does not "leak down" through the controller 91, while the system is not operating. References to the drive system being "OFF" will be understood to mean and include both that portion of the vehicle operating cycle when the vehicle is not in a deceleration-acceleration cycle, as well as those times when the vehicle is not operating at all (engine "off" conditions).

Referring still primarily to FIG. 2, the drive system 11 includes a bypass valve assembly, generally designated 99, which may also be referred to as an "unloading" valve or as a "dump" valve, as those terms are well understood in the valve art. Thus, the bypass valve assembly 99 will "unload" the pump-motor unit 35 whenever the engine is "off", so that there is no unintended torque transmitted to the drive line 17. As is well known to those skilled in the art of hydraulic circuits, the bypass valve assembly 99 would typically be included in such a circuit to "unload" the pump-motor unit 35. It is believed to be within the ability of those skilled in the art to determine the specific design and operation of a particular sub-system, such as the bypass valve assembly 99.

The hydraulic drive system 11 also includes a relief valve, generally designated 101 which, as is shown in FIG. 2, is spring biased to a closed position. An inlet of the relief valve 101 is in communication with a conduit 103, which interconnects the inlet with the port of the high pressure accumulator 41 and with the inlet of the mode control valve 81. Whenever the pressure in the conduit 103 exceeds a predetermined maximum, the relief valve 101 is biased ("downward" in FIG. 2) to a position which permits communication from the conduit 103 to a conduit 105 (which may be considered the "low pressure" side of the system, as will become more apparent subsequently). Finally, referring still to FIG. 2, the hydraulic drive system 11 includes a filter circuit, generally designated 107 which forms no part of the present invention, and therefore, will not be described further herein.

Referring still to FIG. 2, it may be seen that the pump-motor unit 35 includes a port designated A which is connected by means of a conduit 109 to the mode control valve 81. The unit 35 also includes a port designated B which, by means of a conduit 111 is in fluid communication with the filter circuit 107, and also with the conduit 105, such that the conduits 105 and 111 comprise the "low pressure" side of the system, as was mentioned previously. As will be seen from the subsequent description, when the pump-motor unit 35 is in the pumping mode, the port A is the outlet port (see arrows in pump symbol in FIG. 2), and when the unit 35 is in the motoring mode, the port A is the pressurized inlet port and the port B is the exhaust, outlet port.

Referring still primarily to FIG. 2, the general operation of the hydraulic drive system 11 will be described briefly. As was mentioned previously, when the vehicle is neither decelerating or accelerating, the pump-motor unit 35 (pump-motor portion 45 of FIG. 1) is de-clutched, by means of the clutch assembly portion 43, from the intermediate drive shaft, and the overall vehicle drive system shown in FIG. 1 operates in the same manner as if the hydraulic drive system 11 were not present.

When the vehicle operator begins to perform a braking operation, one result is that the clutch assembly portion 43 is actuated, such that the pump-motor unit 35 is now clutched to the drive line 17, and an appropriate command is provided to the electro-hydraulic controller 91 (if the unit 35 had been in the motoring mode), displacing the swashplate 95 in a direction such that the rotation of the drive line 17 (with the vehicle moving in a forward direction) causes the pump-motor unit 35 to pump pressurized fluid from the port A to the conduit 109. As is now well known to those skilled in the art of hydraulic regenerative braking systems, the displacement of the swashplate 95 (and therefore, the fluid output per rotation of the drive line 17) is typically proportional to the extent to which the vehicle operator depresses the brake pedal. It is now known to those skilled in the art how to set the displacement of the swashplate 95 proportional to the brake torque applied by the operator, or proportional to the displacement of the brake pedal, although the particular means, or criteria, selected for setting the displacement of the swashplate 95 is not essential to the present invention.

With the pump-motor unit 35 in the pumping mode, pressurized fluid communicated through the conduit 109 unseats a poppet member 113 in the mode control valve 81, such that the pressurized fluid flows into the conduit 103, and from there, pressurizes the high pressure accumulator 41. In the subject embodiment, and by way of example only, the high pressure accumulator 41 is of the gas-charge type. A hydraulic pressure is necessarily maintained such that a minimum amount of oil is always retained in the high pressure accumulator 41 (such that there is always intended to be a minimum pressure charge in both of the conduits 93 and 103). At the end of a typical deceleration cycle, the high pressure accumulator 41 is charged up to nearly the maximum system pressure, typically about 5000 psi.

At the completion of the deceleration portion of the braking cycle, when the vehicle operator releases the brake pedal and thereafter, begins to depress the accelerator, an appropriate signal is communicated to the electro-hydraulic controller 91 which commands the pump-motor unit 35 to transition from the pumping mode (described previously), to the motoring mode. In the motoring mode, the swashplate 95 is disposed at an inclination opposite that which existed when the unit was in the pumping mode (i.e., the swashplate 95 goes "over-center"). When the pump-motor unit 35 is in the motoring mode, the swashplate 95 is displaced such that flow through the pump-motor unit 35 (from port A to port B) will cause the pump-motor unit 35 to transmit torque to the drive line 17, tending to drive the drive line 17 in a direction corresponding to forward movement of the vehicle. In the subject embodiment, and by way of example only, the mode control valve 81 is constructed such that pressurized fluid can always flow from the conduit 109 to the conduit 103 (i.e., the pumping mode). However, only when the mode pilot valve 85 receives an appropriate input signal to its solenoid is there an appropriate pilot signal 115 which assists in the opening of the poppet member 113, to permit relatively unrestricted flow of high pressure fluid from the accumulator 41 through the conduit 103 and then through the conduit 109 to the port A of the pump-motor unit 35.

In the subject embodiment, and by way of example only, the low pressure accumulator 39 is also of the gas-charge type, and always maintains a minimum inlet charge pressure at the pump-motor inlet port B of about 50 psi. This is true even toward the end of the deceleration portion of the cycle, after the unit 35 has pumped up the high pressure accumulator 41. After the completion of the acceleration portion of the cycle, when the low pressure accumulator 39 contains almost all of the oil, the pressure in the low pressure accumulator 39 rises to about 150 psi, in the subject embodiment, and by way of example only.

Figure 3:
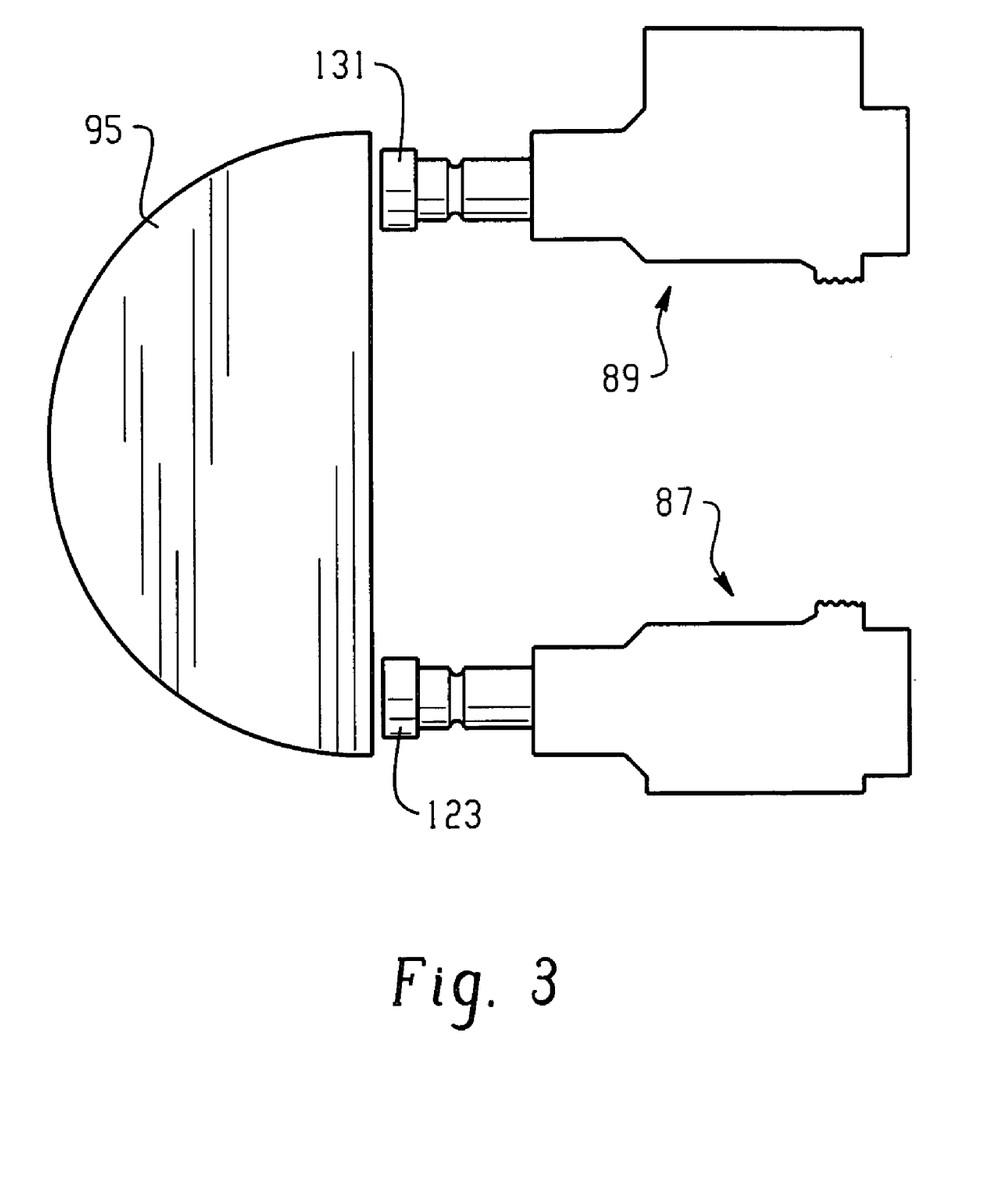
FIG. 3 is a somewhat schematic representation of the pump-motor unit, and specifically, the swashplate and the fluid pressure actuators for displacing the swashplate.

Referring now primarily to FIG. 3, the pump-motor unit 35 is shown in somewhat greater structural detail than in the schematic view of FIG. 2. In the schematic view of FIG. 2 (and in conventional axial piston practice), the servo actuators 87 and 89 are shown as being identical. However, and as was described somewhat in the Background of the Disclosure, there is one operating condition under which the conventional servo actuator arrangement, not including the present invention, is not fully satisfactory. If, especially after the vehicle is not operated for a period of time, there is a leak-down from the high pressure accumulator 41 through, for example, the controller 91, there may be a condition in which the entire hydraulic drive system shown in FIG. 2 has "equalized" at low pressure (perhaps equal to the case drain pressure). If the described condition occurs, there will thereafter be no pressure differential available (from the "high" side of the system to the "low" side) to achieve the desired stroking of the servo actuators.

Figure 4:
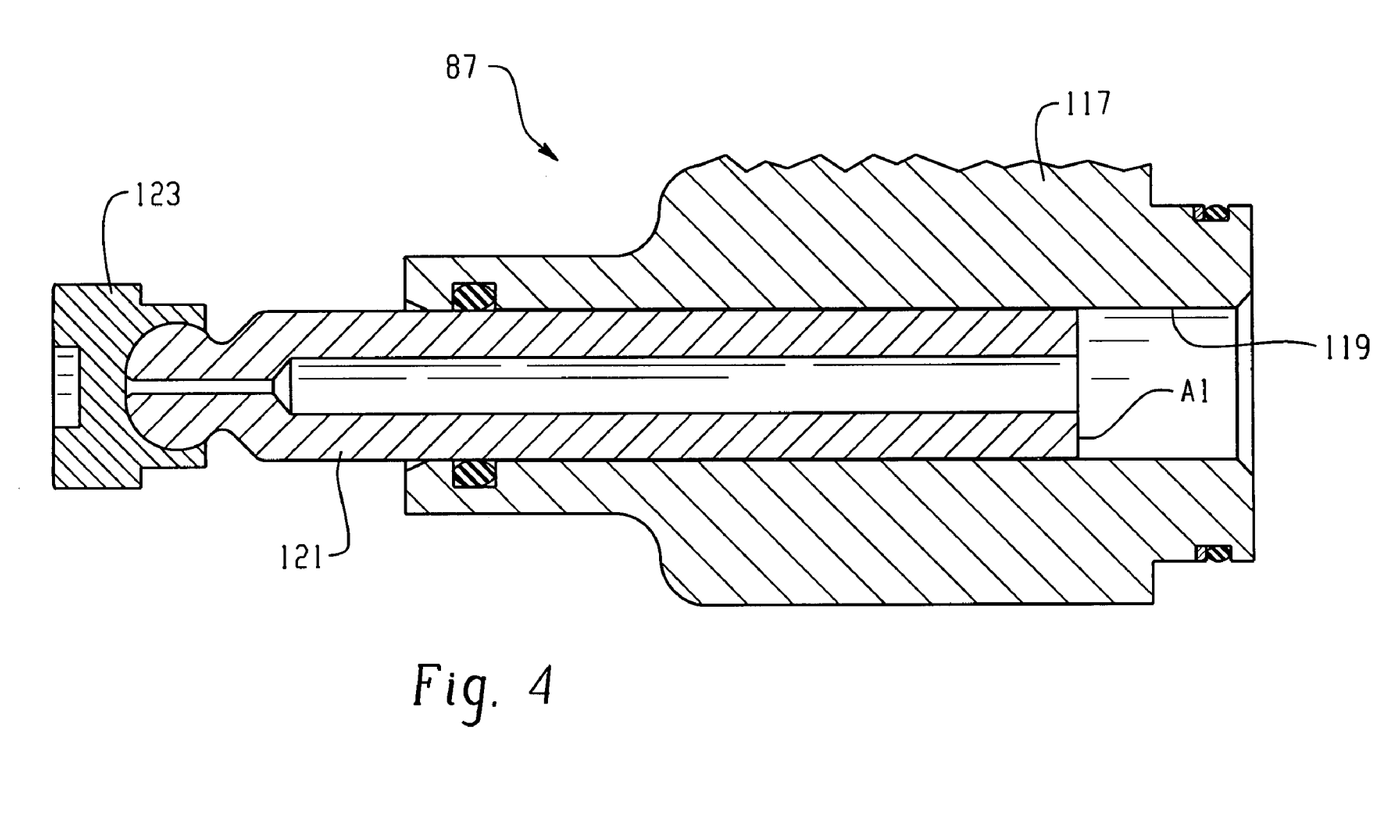
FIG. 4 is an enlarged, axial cross-section of the conventional, first fluid pressure actuator shown schematically in FIG. 3.

Therefore, in accordance with one aspect of the present invention, and as may be seen in FIGS. 3 and 4, the servo actuator 87 ("fluid pressure actuator") is of conventional construction. Thus, there is a housing portion 117 (preferably separate from the main pump housing, but possibly built into the end cover, etc.) which defines a first piston bore 119, and reciprocably disposed therein is a first control piston 121, having an effective area A1 in fluid communication with the electro-hydraulic controller 91. It should be understood that the present invention is not limited to any particular type or configuration of servo actuator, except as is specifically otherwise recited in the appended claims. Therefore, and by way of example only, the first control piston 121 includes a "slipper" 123, the function of which is to ride on the surface of swashplate 95 (see FIG. 3), in a manner well known to those skilled in the art, thus transmitting the axial position of the first control piston 121 to the swashplate 95.

Figure 5:
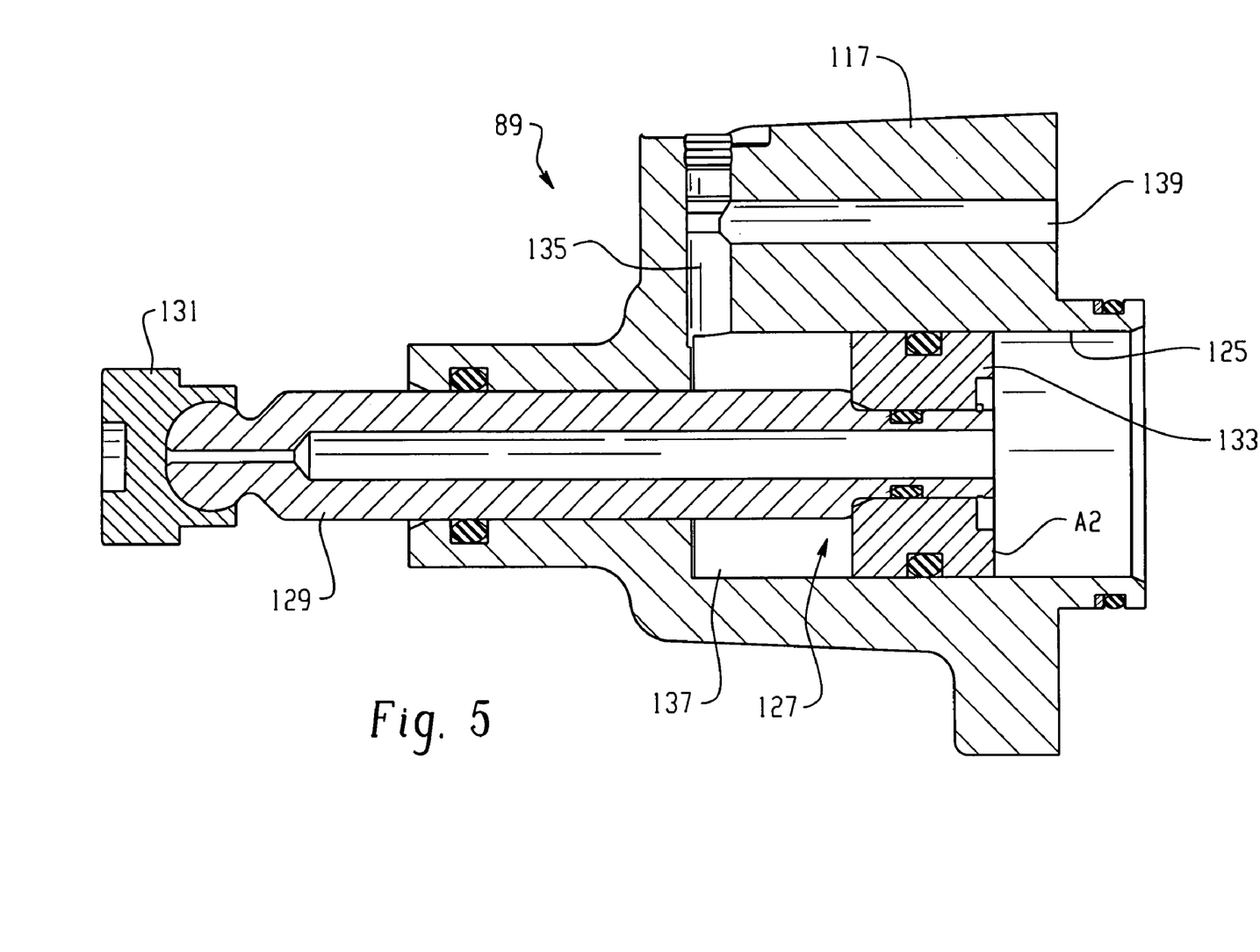
FIG. 5 is an enlarged, axial cross-section of the second fluid pressure actuator, shown schematically in FIG. 3, made in accordance with the teachings of the present invention.

In accordance with a primary aspect of the present invention, and as may best be seen in FIG. 5, the other servo actuator 89 is not of the same configuration as the servo actuator 87, the differences therebetween to be explained subsequently. It should be understood that, in accordance with the invention, there may be a number of parts and aspects of the servo actuators which are the same or similar, but there is one primary distinction. Thus, the housing portion 117 defines a second bore 125, which is at least somewhat larger than the first piston bore 119. Disposed within the second piston bore 125 is a second control piston 127, or more accurately, a second control piston assembly. The second control piston 127 includes a relatively smaller piston portion 129 which includes, in the subject embodiment, a slipper 131, which may be of the same construction and serve the same purpose as the slipper 123 shown in FIG. 4.

The second control piston 127 also includes a relatively larger piston portion 133 which is preferably attached, in any suitable manner, to the smaller piston portion 129, such that the piston portions 129 and 133 reciprocate together as a unit within the second piston bore 125. In accordance with the invention, the larger piston portion 133 has an effective area A2 in fluid communication with the electro-hydraulic controller 91, the effective area A2 being at least somewhat greater than the effective area A1 of the first control piston 121, for reasons to be described subsequently. The housing portion 117 defines a radial passage 135 in open communication with a forward portion 137 of the second piston bore 125, i.e., the portion disposed between the bore 125 and the larger piston portion 133. In the subject embodiment, and by way of example only, there is an axial vent passage 139 having its forward end (left end in FIG. 5) in communication with the radial passage 135, and its rearward end open to the atmosphere (14.7 psi., 1.0 bar), for reasons to be described in greater detail subsequently.

In operation, when normal control pressure is communicated to either the first control piston 121 or to the second control piston 127, the swashplate 95 is moved in the desired direction (tilt direction), and to the desired extent (tilt angle), in a manner well known to those skilled in the art of variable displacement axial piston devices. If there is a leak-down condition, the fluid pressures in the conduits 93, 105, 109, and 111 may all be at substantially the same low pressure (e.g., anywhere from about 50 psi. (3.4 bar) to about 150 psi. (10.2 bar)). In such a leak-down condition, and in the conventional, prior art unit, without the present invention, both servo actuators would have been as shown in FIG. 4, in which case, there would be the same low pressure acting on both control pistons (which would have had the same effective areas), and the swashplate of the pump-motor unit would have remained in whatever was the last position of the swashplate, with no readily available means to displace the swashplate to whatever is now its desired position, especially if the swashplate was already in its neutral condition.

With the present invention, the low pressure (during such a leak-down condition) would be exerting a force over the effective area A1 of the control piston 121, but with the same low pressure acting on both ends of the control piston 121, so that it is effectively balanced. At the same time, the same low pressure is also exerting a force over the effective area A2 of the control piston 127, but as a result of the somewhat greater area of the effective area A2, relative to A1, and the fact that the forward portion 137 is vented, there is a net force tending to move the control piston 127 to the left in FIG. 5, and to move the swashplate 95 in the "opposite" displaced direction. Thus, the forward portion 137 is vented, by means of the passages 135 and 139, to facilitate movement of the second control piston 127 to the left in FIG. 5, without the resistance to movement which would be present if fluid were trapped in the forward portion 137. It may now be understood why it is important for the "source of low pressure" (such as the low pressure accumulator 39) to provide a fluid pressure greater than atmospheric. With the chamber 137 vented to atmosphere, even the relatively "low" pressure is sufficient (if the chamber 137 is vented to atmosphere) to create a force imbalance on the second control piston 127 and move the swashplate 95 into at least a slightly displaced condition.

It is important to note that, with substantially the entire hydraulic system at low pressure (case, etc.), all other portions of the swashplate displacement control mechanism which "see" the low pressure are the same (i.e., have the same effective area). Therefore, and by way of example only, the portion of the smaller piston portion 129 which extends out of the housing portion 117 present exactly the same area as does the first control piston 121. Thus, and in accordance with an important aspect of the invention, the only substantial difference between the servo actuators 87 and 89, which results in a different force on the swashplate 95, is the effective area A2 being greater than the effective area A1.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. A hydraulic drive system including a hydrostatic pump-motor unit operable, in a pumping mode, to receive torque from a drive line, and operable, in a motoring mode, to transmit drive torque to said drive line; a high pressure accumulator in fluid communication with a first port of said pump-motor unit, and a low pressure source in fluid communication with a second port of said pump-motor unit; said pump-motor unit including a swashplate having a neutral position and first and second displaced positions oppositely disposed about said neutral position; said pump-motor unit further comprising first and second fluid pressure actuators operably associated with said swashplate to displace said swashplate from said neutral position toward said first and second displaced positions, respectively; main control means in fluid communication with said first and second fluid pressure actuators, and with said high pressure accumulator and with said low pressure source, whereby the displacement of said swashplate is proportional to substantially only the difference in fluid pressure between said high pressure accumulator and said low pressure source; said first fluid pressure actuator includes a housing portion defining a first piston bore and a first control piston disposed within said first piston bore, said first control piston having a first effective area in fluid communication with said main control means; characterized by:
    (a) said second fluid pressure actuator includes a housing portion defining a second piston bore and a second control piston disposed within said second piston bore, said second control piston having a second effective area in fluid communication with said main control means; and
    (b) said second effective area being at least somewhat greater than said first effective area whereby, in the event of said high pressure accumulator and low pressure source being at substantially the same pressure, said pressure acting on both of said first and said second effective areas will displace said swashplate from said neutral position toward said second displaced position.

2. A hydraulic drive system as claimed in claim 1, characterized by said second piston bore cooperating with said second control piston to define one chamber having said second effective area, and being in fluid communication with said main control means, and another chamber, said another chamber being vented.

3. A hydraulic drive system as claimed in claim 2, characterized by said low pressure source comprising an accumulator of the gas charge type, whereby said low pressure source and said high pressure accumulator provide, in the presence of gas pressure in said low pressure accumulator, at least a predetermined minimum control pressure, and said another chamber defined by said second control piston is vented to atmospheric pressure.

* * * * *